(12) United States Patent
Maxwell et al.

(10) Patent No.: US 10,590,843 B2
(45) Date of Patent: Mar. 17, 2020

(54) PORTABLE GENERATOR HAVING A CONFIGURABLE LOAD BANK

(71) Applicant: Savannah River Nuclear Solutions, LLC, Aiken, SC (US)

(72) Inventors: Ryan M. Maxwell, Lexington, SC (US); David R. Dixon, Warrenville, SC (US); David W. Hawver, Aiken, SC (US); Tommy D. Gleaton, Springfield, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 132 days.

(21) Appl. No.: 15/840,481

(22) Filed: Dec. 13, 2017

(65) Prior Publication Data
US 2019/0178155 A1 Jun. 13, 2019

(51) Int. Cl.
*H02P 9/04* (2006.01)
*F02B 63/04* (2006.01)
*H02P 9/10* (2006.01)
*H02P 9/30* (2006.01)

(52) U.S. Cl.
CPC ............ *F02B 63/048* (2013.01); *H02P 9/107* (2013.01); *H02P 9/305* (2013.01)

(58) Field of Classification Search
CPC ......... F02B 63/048; H02P 9/107; H02P 9/305
See application file for complete search history.

(56) References Cited

U.S. PATENT DOCUMENTS

| | | | | |
|---|---|---|---|---|
| 3,378,755 A | * | 4/1968 | Sawyer | H02J 7/1484 322/29 |
| 3,829,652 A | * | 8/1974 | Terry | B23K 9/1012 219/133 |
| 5,424,588 A | | 6/1995 | Cantor | |
| 6,005,786 A | * | 12/1999 | Bluemel | H02K 3/28 307/71 |
| 6,833,636 B1 | | 12/2004 | Nestel | |
| 6,993,923 B2 | | 2/2006 | Beers | |
| 7,948,111 B2 | | 5/2011 | Nigam | |
| 8,483,982 B2 | | 7/2013 | Hancock | |
| 8,816,651 B1 | * | 8/2014 | Fell | H02P 9/006 322/21 |
| 9,366,164 B2 | * | 6/2016 | Matsuo | F01N 3/0234 |
| 9,537,315 B2 | | 1/2017 | Kuttel et al. | |
| 2011/0000655 A1 | | 1/2011 | Coulthurst | |
| 2012/0003131 A1 | * | 1/2012 | Ibrahim | B01D 46/002 423/212 |
| 2012/0223663 A1 | * | 9/2012 | Dietl | B25F 5/00 318/139 |
| 2014/0312711 A1 | | 10/2014 | Warlick | |

(Continued)

*Primary Examiner* — Tulsidas C Patel
*Assistant Examiner* — S. Mikailoff
(74) *Attorney, Agent, or Firm* — Dority & Manning, P.A.

(57) ABSTRACT

A portable generator includes a combustion engine. The portable generator includes an electric generator coupled to the combustion engine. The portable generator can include a load bank. When the electric generator operates at a first voltage and generates less than a threshold amount, the load bank is coupled to the electric generator in a first configuration. When the electric generator operates at a second voltage that is different than the first voltage, the load bank is coupled to the electric generator in a second configuration that is different than the first configuration.

15 Claims, 11 Drawing Sheets

(56) References Cited

U.S. PATENT DOCUMENTS

| | | | |
|---|---|---|---|
| 2015/0033716 A1* | 2/2015 | Matsuo | F01N 3/0234 |
| | | | 60/320 |
| 2016/0090189 A1* | 3/2016 | Wangemann | H02P 25/184 |
| | | | 60/698 |
| 2017/0234591 A1* | 8/2017 | Kandasamy | F25B 49/02 |
| | | | 62/56 |
| 2018/0026563 A1* | 1/2018 | Schnetzka | H02P 9/48 |
| | | | 290/44 |
| 2018/0283294 A1* | 10/2018 | Matsuyama | H02P 25/184 |
| 2019/0178155 A1* | 6/2019 | Maxwell | F02B 63/048 |

* cited by examiner

PORTABLE GENERATOR HAVING A CONFIGURABLE LOAD BANK

STATEMENT AS TO RIGHTS TO INVENTIONS MADE UNDER FEDERALLY SPONSORED RESEARCH AND DEVELOPMENT

This invention was made with government support under Contract No. DE-AC09-08SR22470 awarded by the U.S. Department of Energy. The government has certain rights in the invention.

FIELD

The present disclosure relates generally to portable generators.

BACKGROUND

Portable generators are often operated under variable load conditions. However, operating portable generators under variable load conditions can present a number of problems. For instance, diesel engines used in portable generators are susceptible to problems associated with light-load conditions. More specifically, when a portable generator with a diesel engine operates at a light-load condition, fuel within the diesel engine remains unburned. The unburned fuel can form deposits (e.g., tar or carbon) that can collect within various parts of the engine, such as the exhaust pipes. When the deposits collect within the various parts of the engine, this is known as "wet stacking."

BRIEF DESCRIPTION

Aspects and advantages of embodiments of the present disclosure will be set forth in part in the following description, or may be learned from the description, or may be learned through practice of the embodiments.

In one example embodiment, a portable generator includes a combustion engine. The portable generator can include an electric generator coupled to the combustion engine. The portable generator can include a load bank. When the electric generator operates at a first voltage and generates less than a threshold amount of electrical power, the load bank is coupled to the electric generator in a first configuration. When the electric generator operates at a second voltage that is different than the first voltage and generates less than the threshold amount of electrical power, the load bank is coupled to the electric generator in a second configuration that is different than the first configuration.

In another example embodiment, a method for controlling operation of a portable generator includes determining, by one or more control devices, whether an electric generator of the portable generator is operating at a first voltage or a second voltage that is different than the first voltage. The method includes determining, by the control device(s), whether the electric generator is generating less than a threshold amount of electrical power. When the control device(s) determine the electric generator is operating at the first voltage and generating less than the threshold amount of electrical power, the method includes generating, by the control device(s), a control action associated with coupling a load bank to the electric generator in a first configuration. When the control device(s) determine the electric generator is operating at the second voltage and generating less than the threshold amount of electrical power, the method includes generating, by the control device(s), a control action associated with coupling the load bank to the electric generator in a second configuration that is different than the first configuration.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a portable generator. The portable generator can include a combustion engine. In some implementations, the combustion engine can be a diesel engine. The portable generator can include an electric generator coupled to the combustion engine. The electric generator can include a rotor and a stator. The rotor can be coupled to an output shaft of the combustion engine. In this way, rotation of the output shaft causes the rotor to rotate and generate a magnetic field. The magnetic field can induce an electric current in windings on the stator. The windings can be coupled to a load, such as a refrigerator, washing machine, or any other suitable device. In this way, the load can receive the electric current that is induced in the windings on the stator.

The portable generator can include a user input device configured to receive an input indicative of an operating voltage for the electric generator. For instance, the user input device can comprise a switch movable between at least a first position and a second position to select the operating voltage for the electric generator. When the switch is in the first position, the operating voltage can correspond to a first voltage. When the switch is in the second position, the operating voltage can correspond to a second voltage that is different than the first voltage. In this way, the switch can be used to select the operating voltage (e.g., first voltage or second voltage) for the electric generator.

The portable generator can include a load bank. In some implementations, the load bank can comprise a plurality of resistors. The load bank can be coupled to the electric generator to increase a power demand on the electric generator. For instance, the load bank can be coupled to the electric generator when an amount of electric power generated by the electric generator is less than a threshold amount of electrical power needed to prevent wet stacking in the combustion engine. In this way, the power demand on the electric generator can be increased so that the electric generator generates an amount of electrical power that is at least equal to the threshold amount. As will be discussed below in more detail, the load bank can be coupled to the electric generator in one of two different configurations based on the operating voltage of the electric generator.

When the electric generator is operating at the first voltage and generates less than the threshold amount of electrical power needed to prevent wet stacking in the combustion engine, the load bank is coupled to the electric generator in a first configuration. More specifically, the resistors of the load bank can be coupled to the electric generator in the first configuration. In some implementations, the first configuration can be a wye configuration. When the resistors of the load bank are coupled to the electric generator in the wye configuration, the resistors of the load bank draw electrical power from the electric generator. As such, the power demand on the electric generator can be increased so that the electrical generator generates an amount of electrical power that is at least equal to the threshold amount. In this way, the load bank can be used to prevent the occurrence of wet stacking when the electric generator is operating at the first voltage.

When the electric generator is operating at the second voltage that is different than the first voltage and generates less than the threshold amount of electrical power needed to prevent wet stacking in the combustion engine, the load bank is coupled to the electric generator in a second configuration that is different than the first configuration. More specifically, the resistors of the load bank can be coupled to the electric generator in the second configuration. In some implementations, the second configuration can be a delta configuration. When the load bank is coupled to the electric generator in the delta configuration, the resistors of the load bank draw electrical power from the load bank. As such, the power demand on the electric generator can be increased so that the electrical generator generates an amount of electrical power that is at least equal to the threshold amount. In this way, the load bank can be used to prevent the occurrence of wet stacking when the electric generator is operating at the second voltage.

The portable generator according to example embodiments of the present disclosure can provide a number of technical effects and benefits. For instance, the ability to couple the load bank to the electric generator in one of the first or second configurations depending on the operating voltage of the electric generator allows the portable generator to operate at two distinct operating voltages without the occurrence of wet stacking in the combustion engine.

Figure 1:
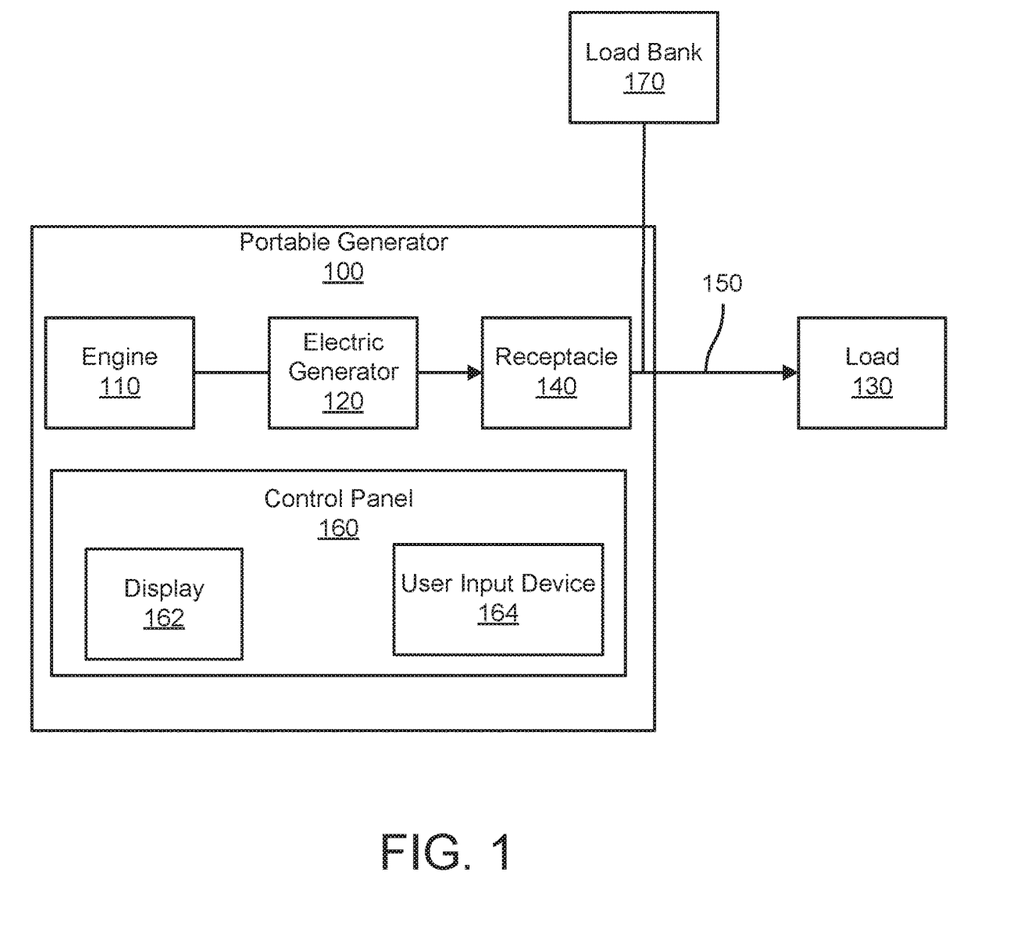
FIG. 1 depicts a portable generator according to example embodiments of the present disclosure.

Referring now to the FIGS., FIG. 1 depicts a portable generator 100 according to example embodiments of the present disclosure. As shown, the portable generator 100 can include a combustion engine 110. In some implementations, the combustion engine 110 can be a diesel engine. The portable generator 100 can include an electric generator 120 coupled to the combustion engine 110. More specifically, the electric generator 120 can be coupled to an output shaft of the combustion engine 110. In this way, the electric generator 120 can convert rotational motion of the output shaft to electrical power. As will be discussed below in more detail, the electrical power can be distributed to a load 130. It should be appreciated that the load 130 can include any suitable electrical device. For instance, the load 130 can include a residential home, or an appliance, such as a refrigerator or washing machine.

In some implementations, the portable generator 100 can include a receptacle 140 coupled to the electric generator 120. The load 130 can be coupled to the receptacle 140 via one or more wires 150. In some implementations, the load 130 can be coupled to the electric generator 120 via an overcurrent protection device (not shown) positioned between the electric generator 120 and the load 130. In any of these implementations, electrical power generated by the electric generator 120 can be provided to the load 130. As will be discussed below in more detail, the portable generator 100 can include a control panel 160 that allows a user to monitor operation of the electric generator 120 and/or control one or more aspects of the electric generator 120.

In some implementations, the control panel 160 can include a display 162 to present one or more operating parameters of the portable generator 100. For instance, the display 162 can present an amount of electrical power (e.g., Watts) output by the electric generator 120. Alternatively or additionally, the control panel 160 can include a user input device 164 configured to receive an input indicative of an operating voltage for the electric generator 120. For instance, the input can be received from a user and can indicate the operating voltage corresponds to a first voltage. Alternatively, the input can indicate the operating voltage corresponds to a second voltage that is different than the first voltage. As an example, the first voltage can be about 240 Volts (V), whereas the second voltage can be about 480 V. It should be appreciated that use of the term "about" in conjunction with a numerical value is intended to refer to any numerical value that is within 10% of the stated The portable generator 100 can also include a load bank 170. In some implementations, the load bank 170 can be positioned within an enclosure (not shown) for the portable generator 100. In particular, the enclosure can be configured to accommodate at least the electric generator 120. In some embodiments, the load bank 170 can be mounted to an interior surface of the enclosure. Alternatively, the load bank 170 can be mounted to an exterior surface of the enclosure. As will be discussed below in more detail, the load bank 170 can be coupled to the electric generator 120 in one of two different configurations based on the operating voltage of the electric generator 120.

Figure 2:
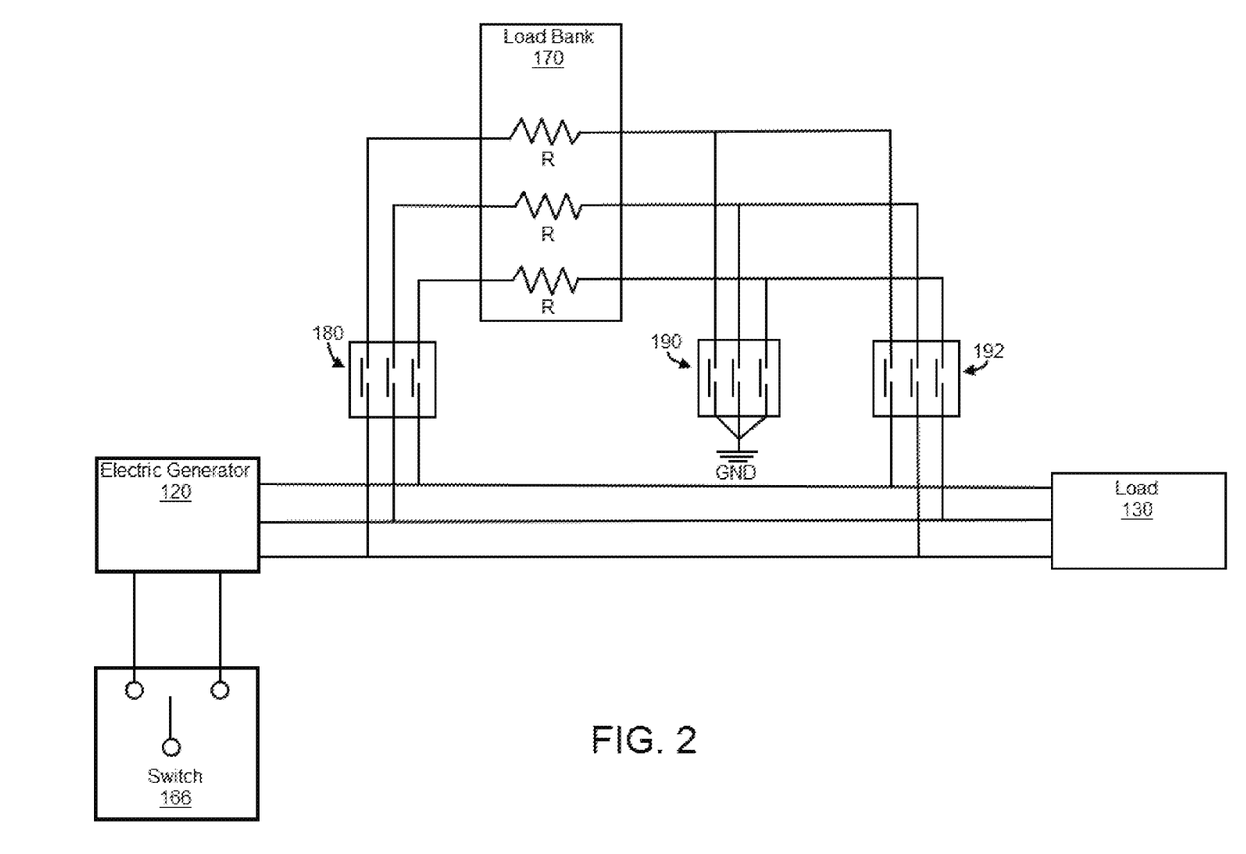
FIG. 2 depicts a load bank that can be coupled to an electric generator in one of a first configuration or a second configuration according to example embodiments of the present disclosure.
Figure 3:
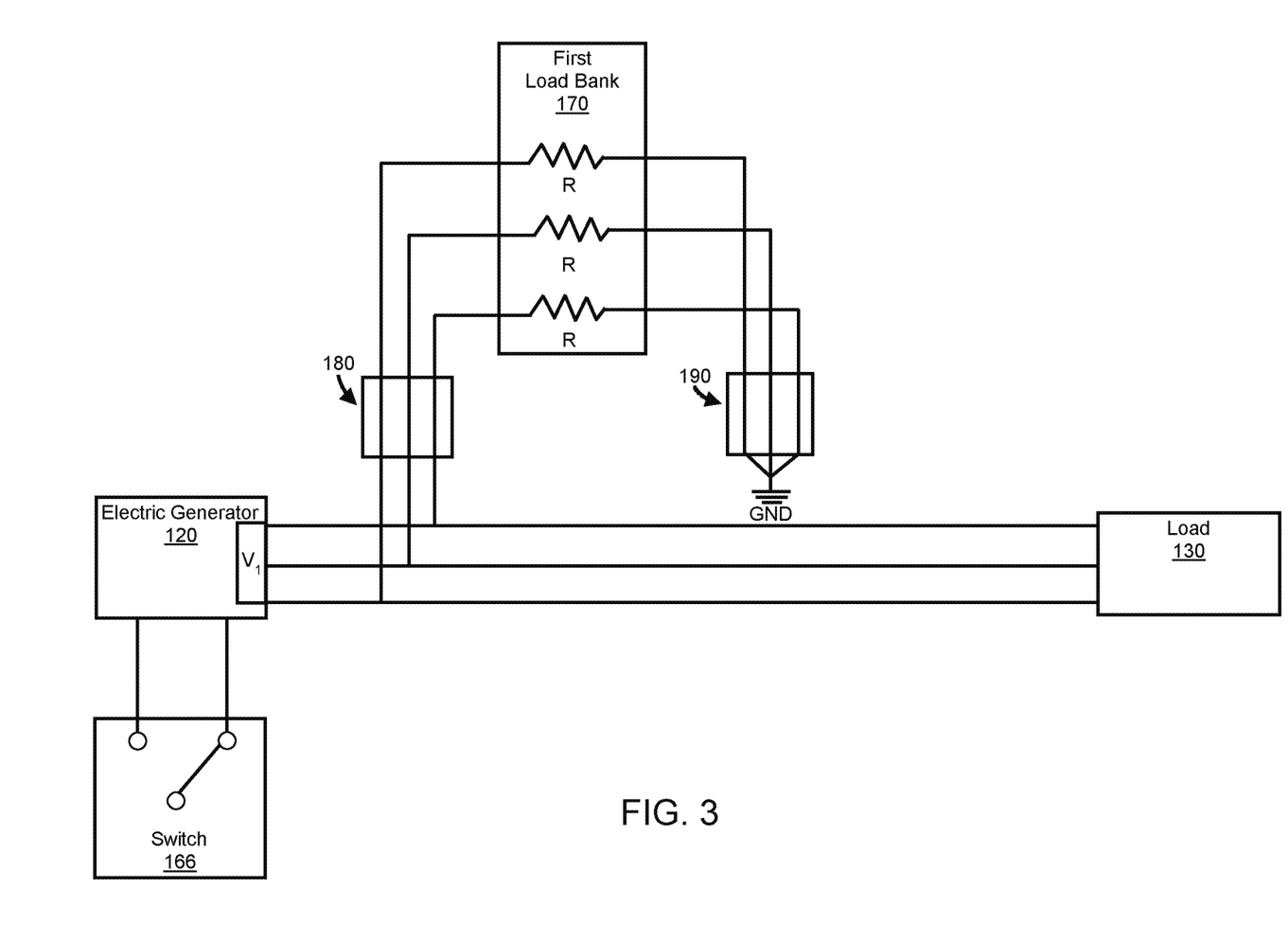
FIG. 3 depicts the load bank of FIG. 2 coupled to the electric generator in the first configuration according to example embodiments of the present disclosure.
Figure 4:
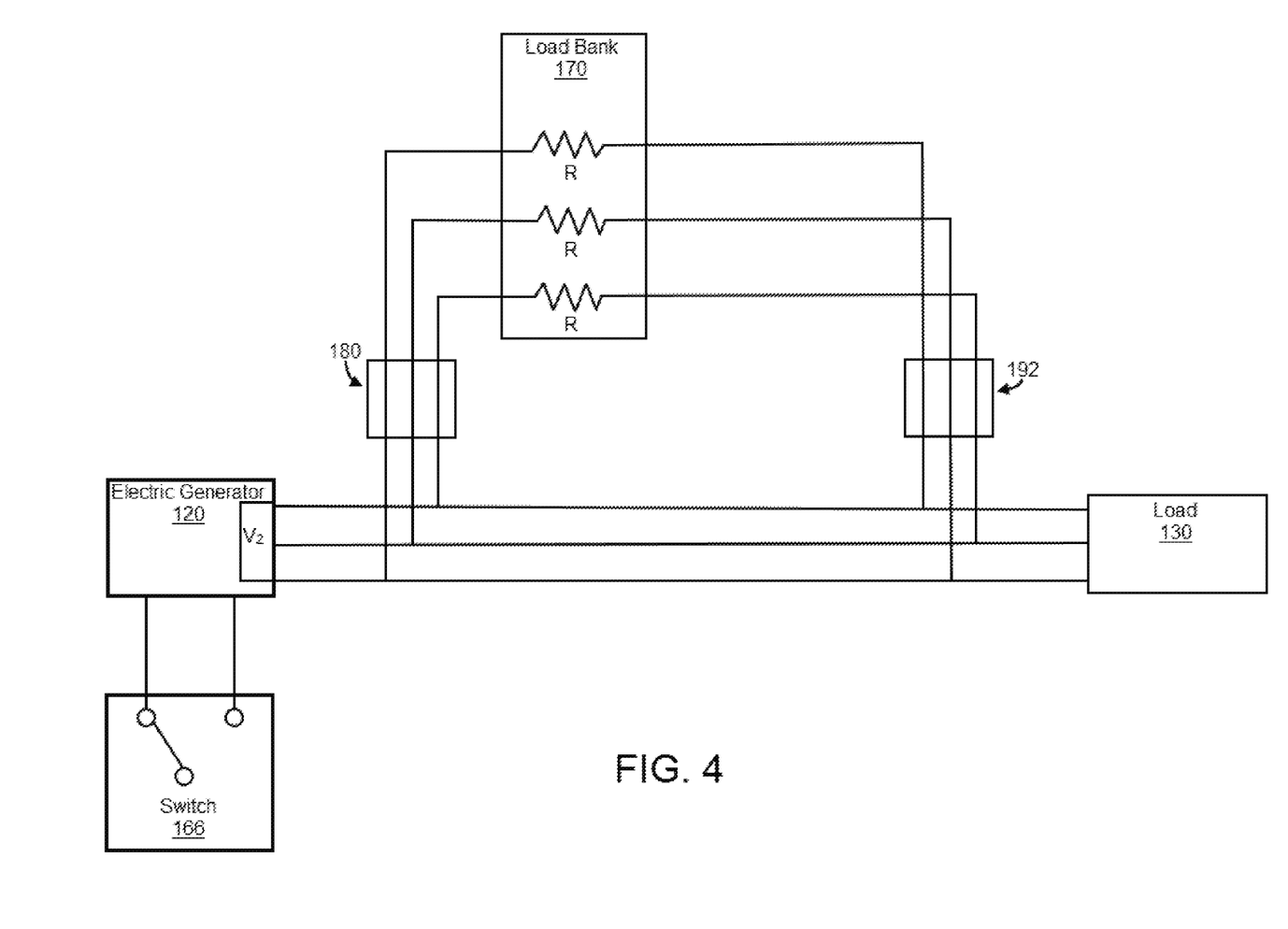
FIG. 4 depicts the load bank of FIG. 2 coupled to the electric generator in the second configuration according to example embodiments of the present disclosure.

Referring now to FIGS. 2-4 in combination, the load bank 170 can include a plurality of resistors R. As shown, the load bank 170 includes three resistors R. It should be appreciated, however, that the load bank 170 can include any suitable number of resistors R. It should also be appreciate that the resistors R can have any suitable numerical value.

The portable generator 100 (FIG. 1) can include a switch 166 movable between at least a first position (FIG. 3) and a second position (FIG. 4). The switch 166 can also be moved to an intermediate third position (FIG. 2) positioned between the first and second positions. In some implementations, the switch 166 can be included on the control panel 160 (FIG. 1) of the portable generator 100 (FIG. 1). More specifically, the switch 166 can be user input device 164 on the control panel 160. Alternatively, the switch 166 can be a standalone switch that is separate from the control panel 160. In some implementations, the switch 166 can be a relay (e.g., electromechanical or solid-state) included within a sensing circuit configured to couple the load bank 170 to the electric generator 120 in one of two different configurations based on the operating voltage of the electric generator 120.

When the switch 166 is in the first position (FIG. 3), the operating voltage of the electric generator 120 corresponds to a first voltage $V_1$. In some implementations, the first voltage $V_1$ can be about 240 V. When the switch 166 is in the second position (FIG. 4), the operating voltage of the electric generator 120 corresponds to a second voltage $V_2$. In some implementations, the second voltage $V_2$ can be about 480 V. When the electric generator 120 is operating at one of the first or second voltages $V_1$ and $V_2$, a first set of contacts 180 positioned between the electric generator 120 and the load bank 170 moves from a first position (FIG. 2) to a second position (FIG. 3). As will be discussed below in more detail, the portable generator 100 can include additional contacts that can be used to couple the load bank 170 to the electric generator 120 in one of the two different configurations.

As shown, the portable generator 100 (FIG. 1) can include a first set of load contacts 190 movable between a first position (FIG. 2) and a second position (FIG. 3) to couple the first load bank 170 to the electric generator 120 in a first configuration (FIG. 3). As shown, the first set of load contacts 190 can be positioned between the load bank 170 and a ground node GND. In some implementations, the first configuration can be a wye configuration.

The portable generator 100 can also include a second set of configuration contacts 192 movable between a first position (FIG. 2) and a second position (FIG. 4) to couple the load bank 170 to the electric generator 120 in a second configuration (FIG. 4). As shown, the second set of load contacts 192 can be positioned between the load bank 170 and the load 130. It should be appreciated that the second configuration is different than the first configuration. For instance, the second configuration can be a delta configuration.

When the electric generator 120 is operating at the first voltage $V_1$ and generating less than a threshold amount of electrical power needed to prevent wet stacking in the combustion engine 110 (FIG. 1), the first set of load contacts 190 move from the first position (FIG. 2) to the second position (FIG. 3). In some implementations, the threshold amount of electrical power can correspond to a percentage of a maximum output power for the electric generator 120. When the first set of contacts 180 and the first set of load contacts 190 are both in the second position, the load bank 170 is coupled to the electric generator 120 in the first configuration (FIG. 3). As such, the resistors R of the load bank 170 can be coupled to the electric generator 120 in the first configuration and can draw electrical power from the electric generator 120. In this way, the power demand on the electric generator 120 can be increased so that the electric generator 120 generates an amount of electrical power that is at least equal to the threshold amount needed to prevent wet stacking. When the power demand of the load 130 alone is greater than or equal to the threshold amount, the first set of load contacts 190 move from the second position to the first position to decouple the load bank 170 from the electric generator 120. Once the load bank 170 is decoupled from the electric generator 120, the resistors R of the load bank 170 can no longer draw electrical power from the electric generator 120.

When the electric generator 120 is operating at the second voltage $V_2$ and generating less than the threshold amount of electrical power needed to prevent wet stacking in the combustion engine 110 (FIG. 1), the second set of load contacts 192 move from the first position (FIG. 2) to the second position (FIG. 4). When the first set of contacts 180 and the second set of load contacts 192 are both in the second position, the load bank 170 is coupled to the electric generator 120 in the second configuration (FIG. 4). As such, the resistors R of the load bank 170 can be coupled to the electric generator 120 in the second configuration and can draw electrical power from the electric generator 120. In this way, the power demand on the electric generator 120 can be increased so that the electric generator 120 generates an amount of electrical power that is at least equal to the threshold amount needed to prevent wet stacking. When the power demand of the load 130 alone is greater than or equal to the threshold amount, the second set of load contacts 190 move from the second position to the first position to decouple the load bank 170 from the electric generator 120. Once the load bank 170 is decoupled from the electric generator 120, the resistors R of the load bank 170 can no longer draw electrical power from the electric generator 120.

Figure 5:
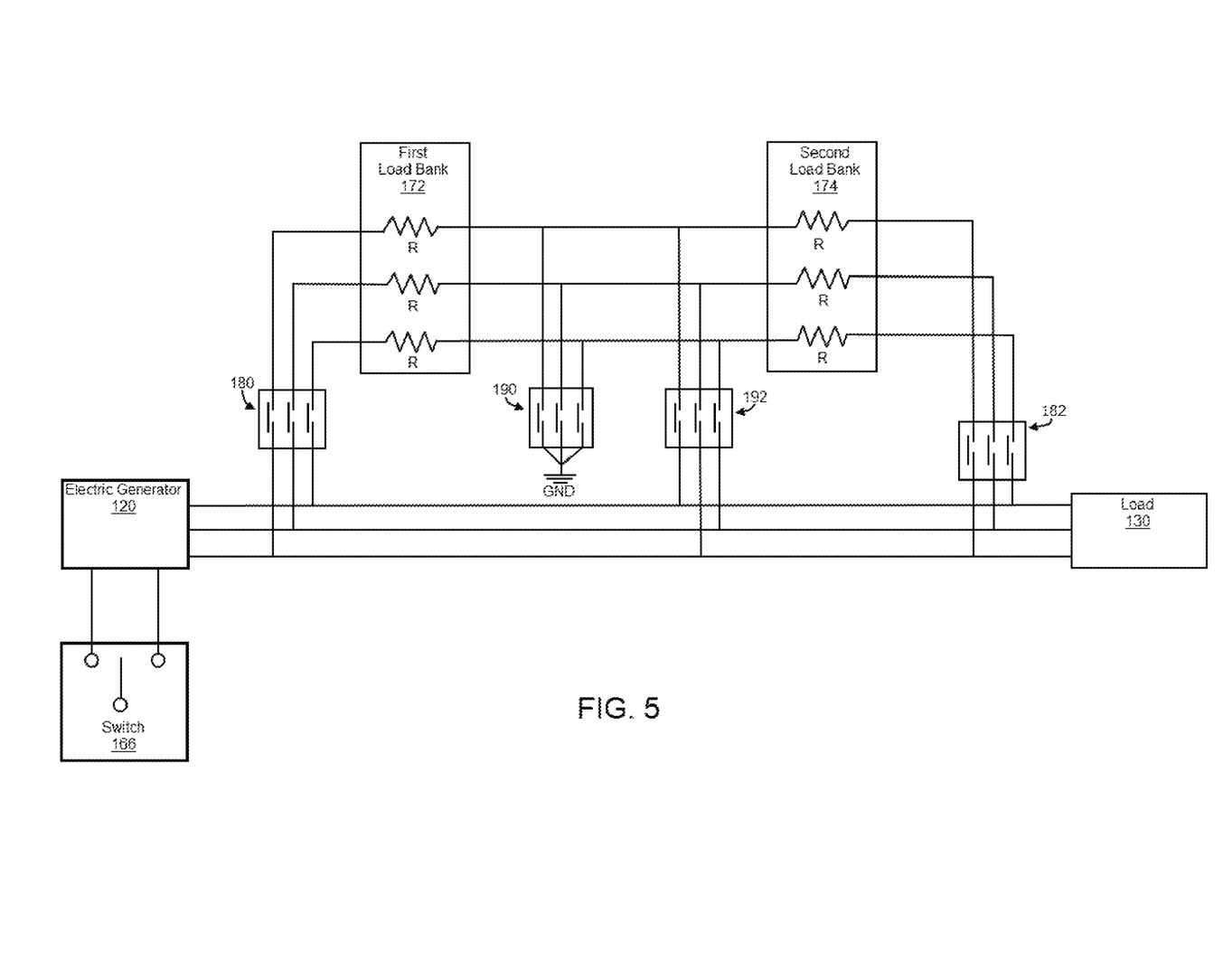
FIG. 5 depicts first and second load banks that can be coupled to an electric generator in a parallel wye configuration or a parallel delta configuration according to example embodiments of the present disclosure.
Figure 6:
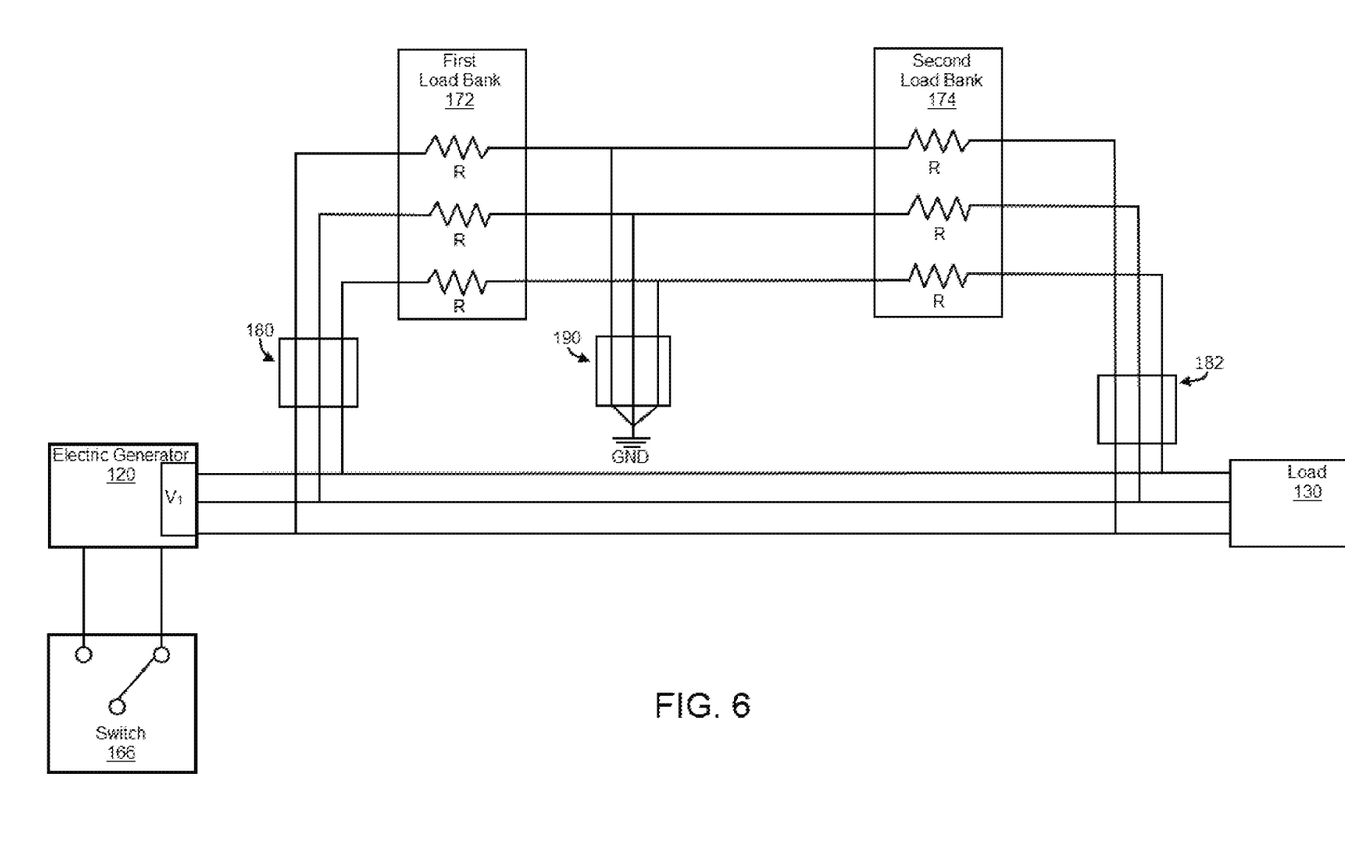
FIG. 6 depicts the first and second load banks coupled to the electric generator in the parallel wye configuration according to example embodiments of the present disclosure.
Figure 7:
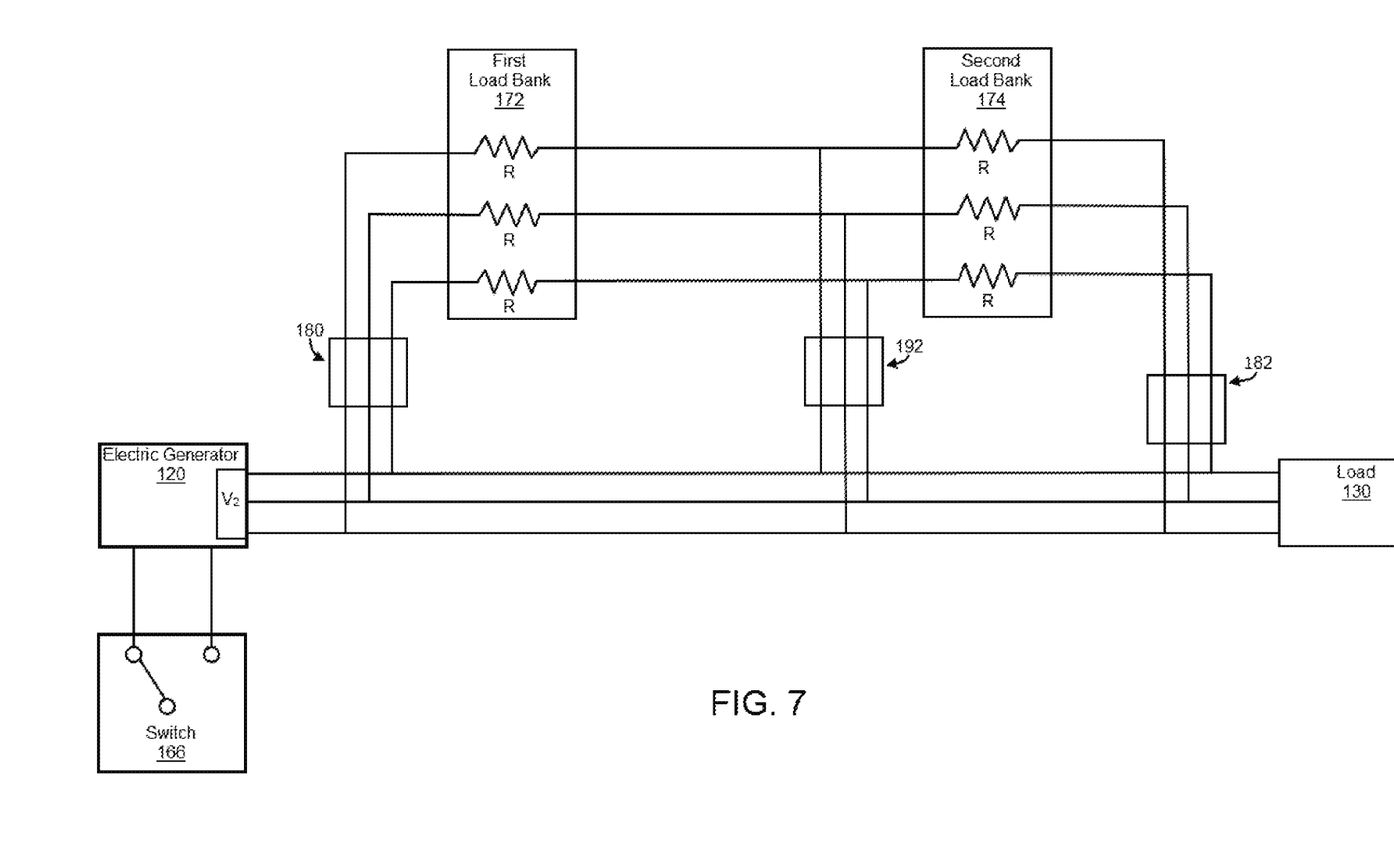
FIG. 7 depicts the first and second load banks coupled to the electric generator in the parallel delta configuration according to example embodiments of the present disclosure.

Referring now to FIGS. 5 through 7, another embodiment of the portable generator 100 (FIG. 1) includes a first load bank 172 and a second load bank 174. The first and second load banks 172, 174 functions in substantially the same manner as the load bank 170 discussed above with reference to FIGS. 2 through 4. However, when the amount of electric power generated by the electric generator 120 is less than the threshold amount despite power demands from both the first load bank 172 and the load 130, the second load bank 174 can be coupled to the electric generator 120. In this way, the power demand on the electric generator 120 can be further increased so that the amount of electrical power generated is at least equal to the threshold amount.

As shown, a second set of contacts 182 can be disposed between the electric generator 120 and the second load bank 174. The second set of contacts 182 are movable between a first position (FIG. 5) and a second position (FIGS. 6 and 7). When the second set of contacts 182 are in the first position, the second load bank 172 is decoupled from the electric generator 120. Conversely, the second load bank 172 is coupled to the electric generator 120 when the second set of contacts 182 are in the second position. When the operating voltage of the electric generator 120 is one of the first or second voltages $V_1$ and $V_2$, it should be appreciated that both the first and second sets of contacts 180, 182 are in the second position.

When the electric generator 120 is operating at the first voltage $V_1$ (FIG. 6) and generates less than the threshold amount of electrical power despite the combined power demand of the first load bank 172 and the load 130, the second set of contacts 182 move to the second position to couple the second load bank 174 to the electric generator 120. In this way, the first and second load bank 172, 174 can be coupled to the electric generator 120 in a parallel wye configuration. When the combined power demand of the first load bank 172 and the load 130 are enough to cause the electric generator 120 to generate an amount of electric power that is greater than the threshold amount, the second set of contacts 182 move from the second position to the first position. In this way, the second load bank 174 can be decoupled from the electric generator 120. Once the second load bank 174 is decoupled from the electric generator 120, the resistors R of the second load bank 174 can no longer draw electric power from the electric generator 120.

When the electric generator 120 is operating at the second voltage $V_2$ (FIG. 7) and generates less than the threshold amount of electrical power despite power demands from both the first load bank 172 and the load 130, the second set of contacts 182 move to the second position to couple the second load bank 174 to the electric generator 120. In this way, the first and second load bank 172, 174 can be coupled to the electric generator 120 in a parallel delta configuration. When the combined power demand of the first load bank 172 and the load 130 are enough to cause the electric generator 120 to generate an amount of electric power that is greater than the threshold amount, the second set of contacts 182 move from the second position to the first position. In this way, the second load bank 174 can be decoupled from the electric generator 120. Once the second load bank 174 is decoupled from the electric generator 120, the resistors R of the second load bank 174 can no longer draw electric power from the electric generator 120.

Figure 8:
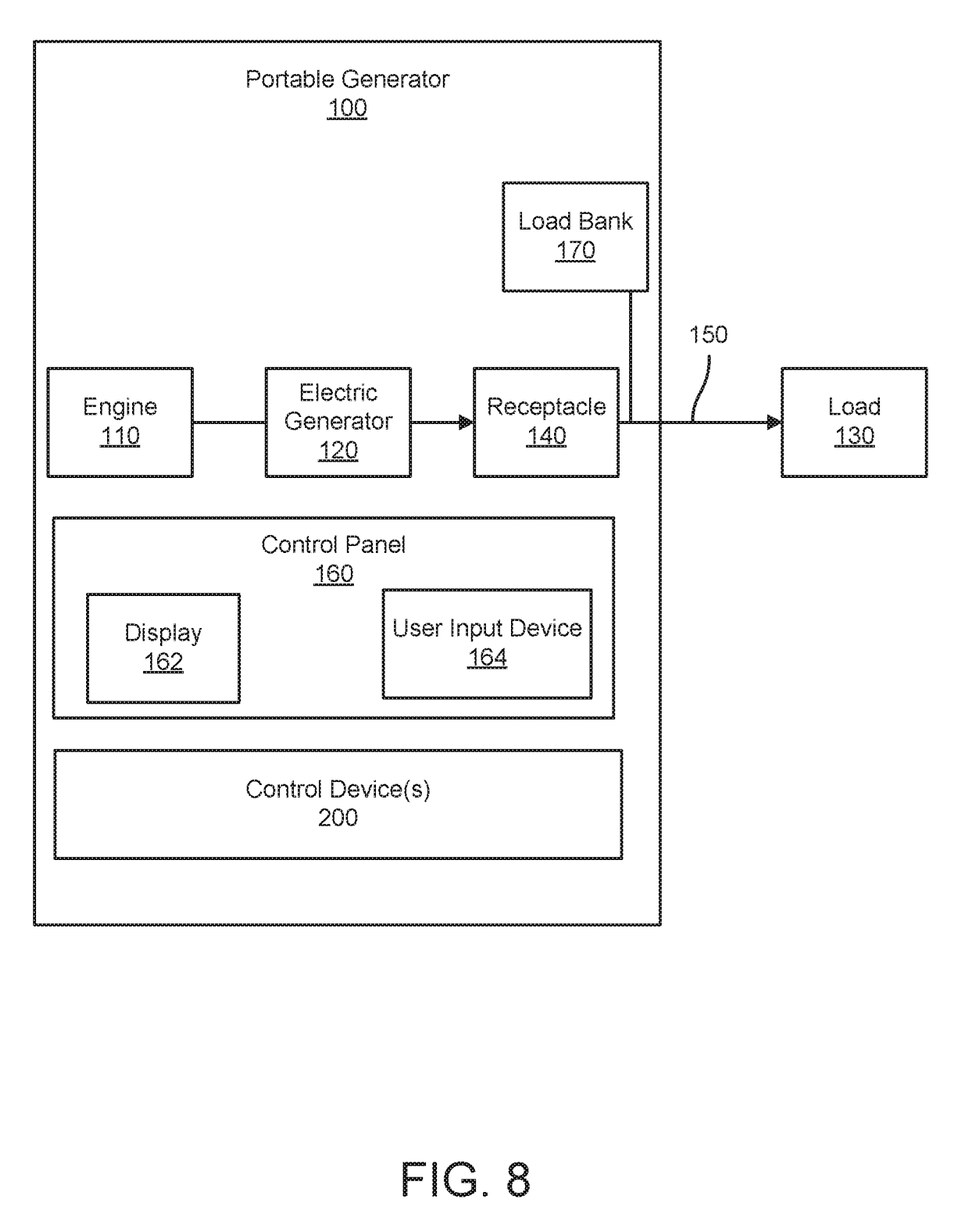
FIG. 8 depicts another portable generator according to example embodiments of the present disclosure.

Referring now briefly to FIG. 8, a block diagram of a portable generator 100 is provided according to example embodiments of the present disclosure. The portable generator 100 depicted in FIG. 8 is configured in substantially the same manner as the portable generator 100 discussed above with reference to FIG. 1. Accordingly, the same or similar numbers may refer to the same or similar parts. For example, the portable generator 100 includes an engine 110 and an electric generator 120 coupled to the engine 110.

However, for the embodiment of FIG. 8, the portable generator 100 includes one or more control device(s) 200. As will be discussed below in more detail, the control device(s) 200 can be configured to control operation of the portable generator 100.

Figure 9:
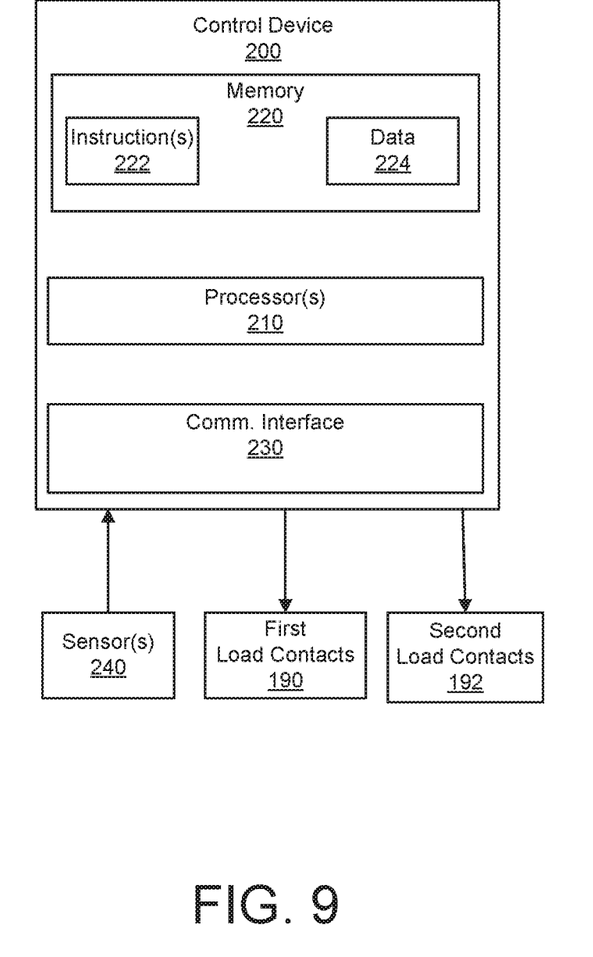
FIG. 9 depicts a block diagram of an example control device according to example embodiments of the present disclosure.

FIG. 9 illustrates one embodiment of suitable components of the control device(s) 200. As shown, the control device(s) 200 can include at least one processor 210 and associated memory device 220 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Examples of the memory device 220 can include computer-readable media including, but not limited to, non-transitory computer-readable media, such as RAM, ROM, hard drives, flash drives, or other suitable memory devices.

The memory device 220 can store information accessible by the processor(s) 210, including computer-readable instructions 222 that can be executed by the processor(s) 210. The computer-readable instructions 222 can be any set of instructions that, when executed by the processor(s) 210, cause the processor(s) 210 to perform operations. The computer-readable instructions 222 can be software written in any suitable programming language or can be implemented in hardware. In some implementations, the computer-readable instructions 222 can be executed by the processor(s) 210 to perform operations, such as controlling operation of the portable generator 100. For instance, the processor(s) 210 can generate a control action associated with coupling a load bank 170 to the electric generator 120 in the first configuration or the second configuration. The memory device 220 can further store data 224 that can be accessed by the control device(s) 200. In example embodiments, the data 224 can include data indicative of a threshold amount of electrical power the electric generator 120 (FIG. 9) of the portable generator 100 needs to generate in order to prevent wet stacking in the combustion engine 110 of the portable generator 100. Alternatively or additionally, the data 224 can include a minimum amount of electric current the electric generator 120 must output in order to prevent wet stacking in the combustion engine 110. In some implementations, the minimum amount of electric current can be different based on the operating voltage of the electric generator 120. For instance, a minimum amount of electric current needed when the electric generator 120 is operating at the first voltage $V_1$ can be different than a minimum amount of electric current needed when the electric generator 120 is operating at the second voltage $V_2$.

As shown in FIG. 9, the control device(s) 200 can include a communications interface 230. In example embodiments, the communications interface 230 can include associated electronic circuitry that can be used to communicatively couple the control device(s) 200 with other devices, such as sensors 240 configured to monitor voltage and/or current characteristics of the electric generator 120. Alternatively or additionally, the communication interface 230 can allow the control device(s) 200 to communicate one or more control signals to the first set of load contacts 190 and the second set of load contacts 192.

Figure 10:
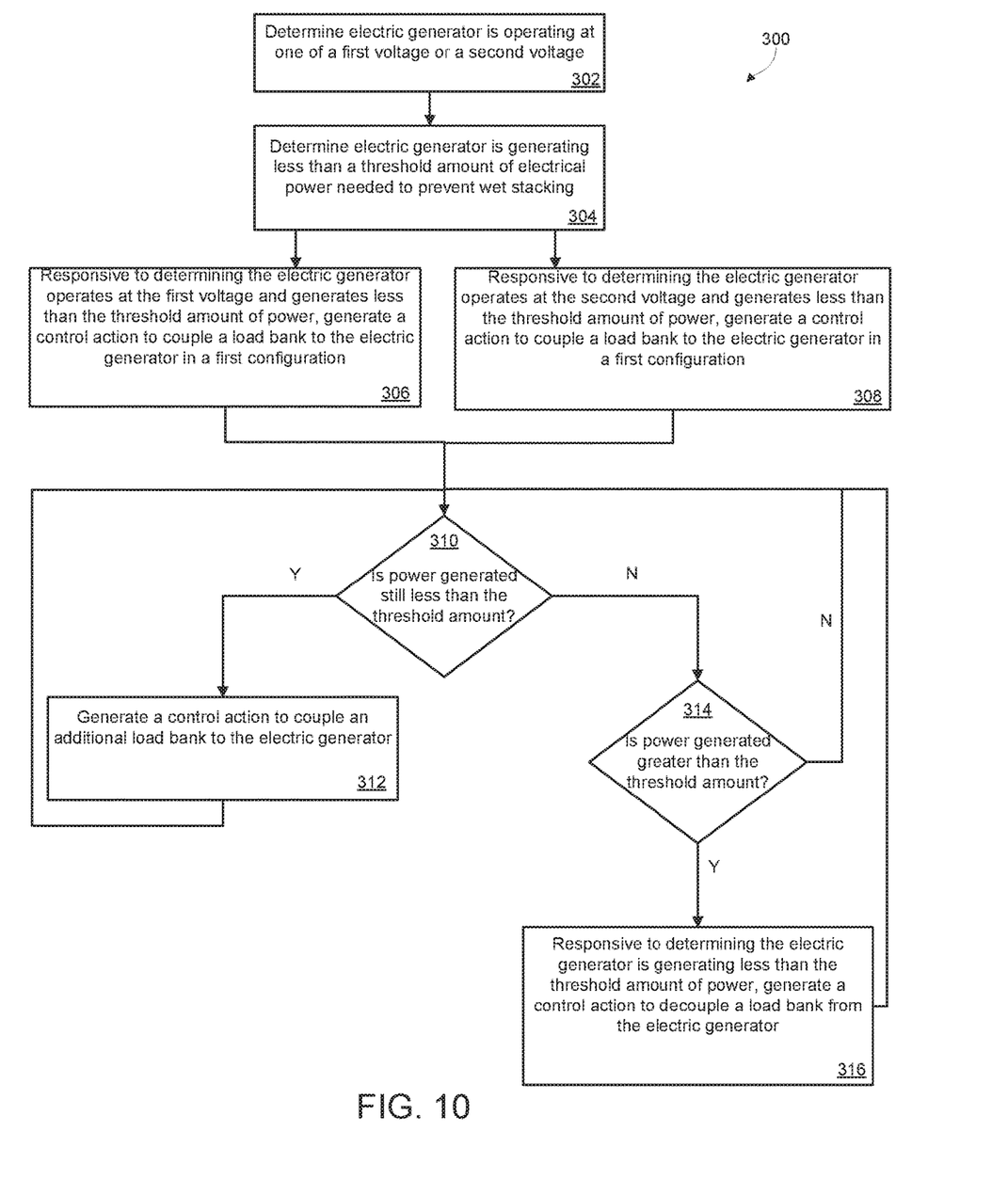
FIG. 10 depicts a flow diagram of a method for controlling operation of a portable generator according to example embodiments of the present disclosure.

Referring now to FIG. 10, a flow diagram of one example method 300 for controlling operation of a portable generator is provided according to example embodiments of the present disclosure. In general, the method 300 will be discussed with reference to the portable generator 100 described above with reference to FIGS. 1 through 9. However, it should be appreciated by those of ordinary skill in the art that the disclosed method 300 can generally be implemented with portable generators having any other suitable configuration. In addition, although FIG. 10 depicts steps performed in a particular order for purposes of illustration and discussion, the method discussed herein can be omitted, rearranged, combined, and/or adapted in various ways without deviating from the scope of the present disclosure.

At (302), the method 300 can include determining whether an electric generator of the portable generator is operating at one of a first voltage or a second voltage. In some implementations, one or more control devices of the portable generator can receive the data from the user input interface. For instance, the one or more control device(s) can receive a control signal from the user input interface. More specifically, the control signal can indicate the operating voltage selected by a user via manipulation of one or more input devices on the control panel.

At (304), the method 300 can include determining whether the electric generator is generating less than a threshold amount of electrical power. In some implementations, the control device(s) can receive data indicative of an electric current generated by the electric generator. The control device(s) can be configured to compare the data against one or more predefined values indicative of a minimum amount of electric current needed to prevent wet stacking in the combustion engine. For instance, the predefined values can include a first threshold value and a second threshold value. The first threshold value can indicate a minimum amount of electric current needed to prevent wet stacking when the electric generator operates at the first voltage. The second threshold value can indicate a minimum amount of electric current needed to prevent wet stacking when the electric generator operates at the second voltage.

When the control device(s) determine the electric generator is operating at the first voltage and generating less than the threshold amount of power, the method 300 includes, at (306), generating, by the control device(s), a control action associated with coupling a load bank to the electric generator in a first configuration. In some implementations, the control action can include actuating the first set of load contacts to move from the first position to the second position. In this way, the load bank can be coupled to the electric generator in the first configuration. The method 300 then proceeds to (310).

When the control device(s) determine the electric generator is operating at the second voltage and generating less than the threshold amount of power, the method 300 includes, at (308), generating, by the control device(s), a control action associated with coupling the load bank to the electric generator in a second configuration that is different than the first configuration. In some implementations, the control action can include actuating the second set of load contacts to move from the first position to the second position. In this way, the load bank can be coupled to the electric generator in the second configuration. The method 300 then proceeds to (310).

When the load bank is coupled to the electric generator in one of the first or second configurations, the method 300 can further include, at (310), determining, by the control device(s), whether the electric generator is generating less than the threshold amount of power despite the additional power demand of the load bank. In some implementations, the control device(s) can receive data indicative of an electric current generated by the electric generator. The control device(s) can be configured to compare the data against the first and second threshold values mentioned above at (304). If the electric generator is operating at the first voltage and generates an electric current that is less than the first threshold value, then the method 300 proceeds to (312). Likewise, if the electric generator is operating at the second voltage and generates an electric current that is less than the second threshold value, then the method 300 proceeds to (312). Otherwise, the method 300 proceeds to (314).

At (312), the method 300 includes generating, by the control device(s), a control action associated with coupling an additional load bank to the electric generator. In some implementations, the control action can include actuating a second set of contacts to move from the first position to the second position. Once the additional load bank is coupled the electric generator, the method 300 reverts to (310).

At (314), the method 300 includes determining, by the control device(s), whether the electric generator is generating an amount of electrical power that is greater than the threshold value. In some implementations, the control device(s) can receive data indicative of an electric current generated by the electric generator. If the electric generator is operating at the first voltage and generates an electric current that is greater than the first threshold value, then the method 300 proceeds to (316). Likewise, if the electric generator is operating at the second voltage and generates an electric current that is greater than the second threshold value, then the method 300 proceeds to (316). Otherwise, the method 300 reverts to (310).

At (316), the method 300 includes generating a control action associated with decoupling a load bank from the electric generator. For example, the control action can include a control signal transmitted from the control device(s) to the first set load contacts or the second set of load contacts. The control signal can configure the first or second set of load contacts to move from the second position to the first position. In this way, the load bank can be decoupled from the electric generator. Once the first load bank or the second load bank has been decoupled from the electric generator, the method 300 reverts to (310).

Figure 11:
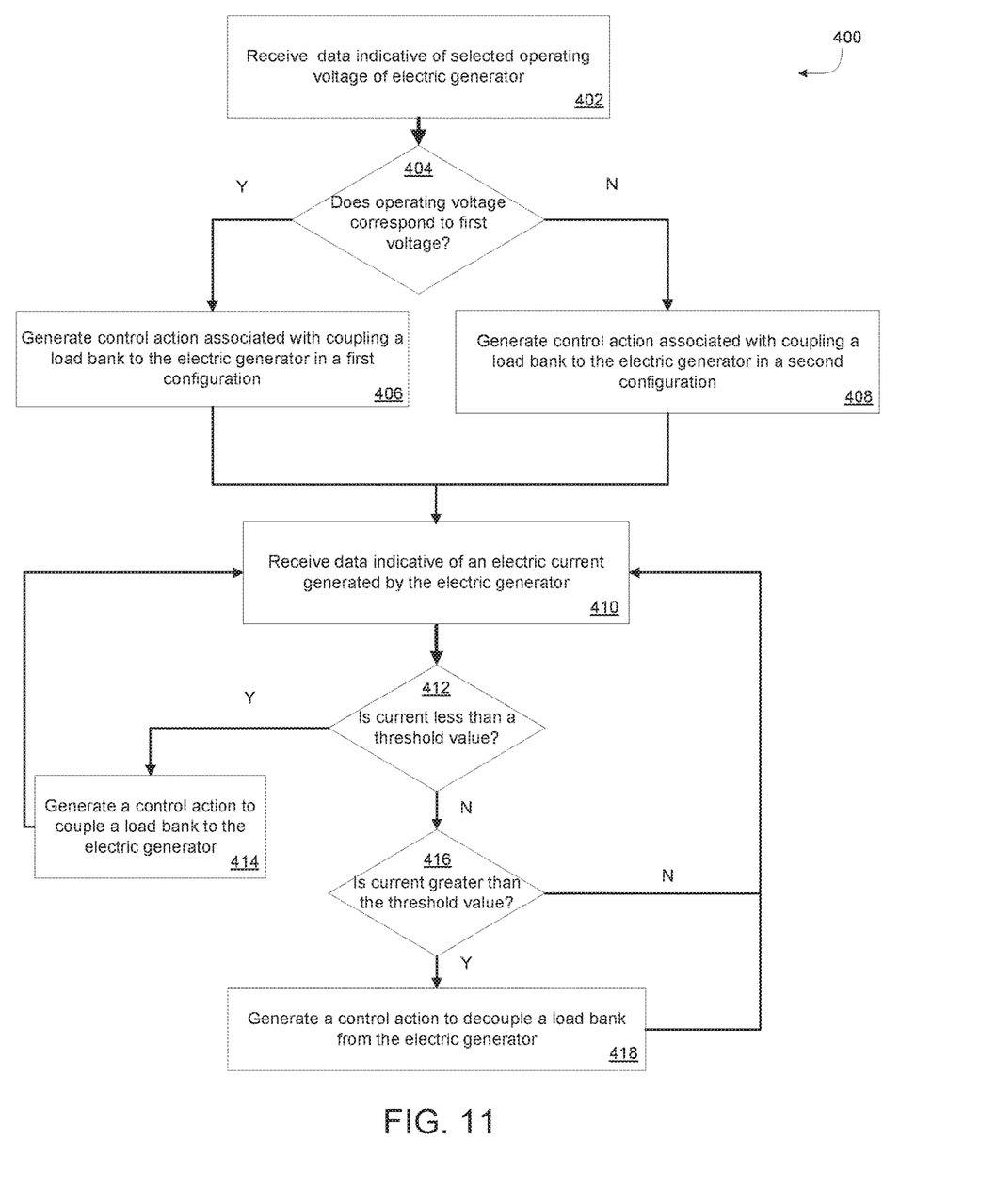
FIG. 11 depicts a flow diagram of another method for controlling operation of a portable generator according to example embodiments of the present disclosure

Referring now to FIG. 11, a flow diagram of one example method 400 for controlling operation of a portable generator is provided according to example embodiments of the present disclosure. In general, the method 400 will be discussed with reference to the portable generator 100 described above with reference to FIGS. 1 through 9. However, it should be appreciated by those of ordinary skill in the art that the disclosed method 400 can generally be implemented with portable generators having any other suitable configuration. In addition, although FIG. 11 depicts steps performed in a particular order for purposes of illustration and discussion, the method discussed herein can be omitted, rearranged, combined, and/or adapted in various ways without deviating from the scope of the present disclosure.

At (402), the method 400 can include receiving data indicative of an operating voltage for the electric generator. In some implementations, one or more control devices of the portable generator can receive the data from the user input interface. For instance, the one or more control device(s) can receive a control signal from the user input interface. More specifically, the control signal can indicate the operating voltage selected by a user via manipulation of one or more input devices on the control panel.

At (404), the method 400 can include determining, by the control device(s), the operating voltage corresponds to one of a first voltage or a second voltage. In some implementations, the control device(s) can be configured to compare operating voltage determined at (402) against predefined value (e.g., the first and second voltages) stored in a memory device associated with the control device(s). When the control device(s) determine the operating voltage determined at (402) corresponds to the first voltage, the method 400 proceeds to (406). Otherwise, the method 400 proceeds to (408).

At (406), the method 400 can include generating, by the control device(s), a control action associated with coupling a first load bank to the electric generator in the first configuration. In some implementations, the control action can include actuating the first set of load contacts to move from the first position to the second position.

At (408), the method 400 can include generating, by the control device(s), a control action associated with coupling the first load bank to the electric generator in the second configuration. In some implementations, the control action can include actuating the second set of configuration contacts to move from the first position to the second position. Once the first load bank is coupled to the electric generator in the first configuration at (406) or the second configuration at (408), the method 400 can proceed to (410).

At (410), the method 400 can include receiving, at the control device(s), data indicative of an electric current generated by the electric generator. In some implementations, the control device(s) can receive the data from one or more sensors, such as a current transformer.

At (412), the method 400 can include comparing the data indicative of the electric current received at (410) against a threshold value. The threshold value can indicate a minimum amount of electric current the electric generator needs to output in order to prevent wet stacking in the combustion engine. When the data indicative of the electric current received at (410) is less than the threshold value, the method 400 proceeds to (414). Otherwise, the method 400 proceeds to (416).

At (414), the method 400 can include generating a control action associated with coupling a second load bank to the electric generator. In some implementations, the control device(s) can communicate a control signal to the second set of contacts to move from the first position to the second position. In this way, the Once the second load bank is coupled to the electric generator, the method 400 can revert to (410).

At (416), the method 400 can include determining whether the electric current generated by the electric generator is greater than the threshold value. When the control device(s) determine the electric current is greater than the threshold value, the method 400 can proceed to (418). Otherwise, the method 400 can revert to (410).

At (418), the method 400 can include generating a control action to decouple a load bank from the electric generator. For example, the control action can include a control signal transmitted from the control device(s) to the first set load contacts or the second set of load contacts. The control signal can configure the first or second set of load contacts to move from the second position to the first position. In this way, the first load bank or the second load bank can be decoupled from the electric generator. Once the first load bank or the second load bank has been decoupled from the electric generator, the method 400 can revert to (410).

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A portable generator, comprising:
   a combustion engine;
   an electric generator coupled to the combustion engine, the electric generator configured to provide electrical power to a load; and
   a load bank that is separate from the load, the load bank coupled to the electric generator when an amount of electrical power the electric generator generates is less than a threshold amount of electrical power;
   wherein when the electric generator operates at a first voltage and generates less than the threshold amount of electrical power, the load bank is coupled to the electric generator in a wye configuration;
   wherein when the electric generator operates at a second voltage that is different than the first voltage and generates less than the threshold amount of electrical power, the load bank is coupled to the electric generator in a delta configuration,
   wherein the threshold amount corresponds to an amount of electrical power needed to prevent wet stacking in the combustion engine, and
   wherein when the load bank is coupled to the electric generator in either the wye configuration or the delta configuration, an electrical power demand on the electric generator is increased so that the amount of electrical power generated by the electric generator is at least equal to the threshold amount of electrical power needed to prevent wet stacking in the combustion engine.

2. The portable generator of claim 1, wherein the amount of electrical power needed to prevent wet stacking corresponds to a percentage of a maximum power output for the electric generator.

3. The portable generator of claim 1, further comprising:
   a user input device configured to receive an input indicative of an operating voltage for the electric generator.

4. The portable generator of claim 3, wherein the user input device comprises a switch movable between at least a first position and a second position to select the operating voltage for the electric generator.

5. The portable generator of claim 4, wherein when the switch is in the first position, the operating voltage corresponds to the first voltage, and wherein when the switch is in the second position, the operating voltage corresponds to the second voltage.

6. The portable generator of claim 1, further comprising an enclosure configured to accommodate at least the electric generator.

7. The portable generator of claim 6, wherein the load bank is positioned within the enclosure.

8. The portable generator of claim 6, wherein the load bank is mounted to the enclosure.

9. The portable generator of claim 1, wherein the load bank is decoupled from the electric generator when the amount electrical power the electric generator generates is greater than the threshold amount of electrical power.

10. The portable generator of claim 1, wherein the second voltage is higher than the first voltage.

11. A method for controlling operation of a portable generator, the portable generator comprising a combustion engine and an electric generator coupled to the combustion engine, the method comprising:
    determining, by one or more control devices, whether the electric generator of the portable generator is operating at a first voltage or a second voltage that is different than the first voltage when the electric generator is providing electrical power to a load;
    determining, by the control device(s), whether an amount of electrical power the electric generator is generating is less than a threshold amount of electrical power;
    responsive to determining the electric generator is operating at the first voltage and generating less than the threshold amount of electrical power, generating, by the control device(s), a control action coupling a load bank to the electric generator in a wye configuration; and responsive to determining the electric generator is operating at the second voltage and generating less than the threshold amount of electrical power, generating, by the control device(s), a control action coupling the load bank to the electric generator in a delta configuration, wherein the threshold amount corresponds to an amount of electrical power needed to prevent wet stacking in the combustion engine, and wherein when the load bank is coupled to the electric generator in either the wye configuration or the delta configuration, an electrical power demand on the electric generator is increased so that the electric generator generates an amount of electrical power that is at least equal to the threshold amount of electrical power needed to prevent wet stacking in the combustion engine.

12. The method of claim 1, wherein the amount of electrical needed to prevent wet stacking corresponds to a percentage of a maximum power output for the electric generator.

13. The method of claim 11, wherein when the load bank is coupled to the electric generator in one of the wye configuration or the delta configuration, the method further comprises:

determining, by the control device(s), an amount of electrical power the electric generator is providing to the load and the load bank is less than the threshold amount of electrical power; and responsive to determining the electric generator is providing less than the threshold amount of electrical power when both the load and the load bank are coupled to the electric generator, generating, by the control device(s), a control action coupling an additional load bank to the electric generator.

14. The method of claim 13, wherein when the electric generator is operating at the first voltage, the load bank and the additional load bank are coupled to the electric generator in a parallel wye configuration.

15. The method of claim 13, wherein when the electric generator is operating at the second voltage, the load bank and the additional load bank are coupled to the electric generator in a parallel delta configuration.

* * * * *